United States Patent [19]

Mollen et al.

[11] 4,399,912

[45] Aug. 23, 1983

[54] TAPE CASSETTE HOLDER

[75] Inventors: Alfred Mollen, Richmond, Va.; Zelman Levine, Minneapolis, Minn.

[73] Assignee: Patent Investment Associates, Richmond, Va.

[21] Appl. No.: 257,169

[22] Filed: Apr. 24, 1981

[51] Int. Cl.³ ............................................. B65D 85/67
[52] U.S. Cl. ..................................... 206/387; 224/312
[58] Field of Search ......................... 206/387; 224/312

[56] References Cited

U.S. PATENT DOCUMENTS

| 3,610,424 | 10/1971 | Connan | 206/387 |
| 3,702,132 | 11/1972 | Fites et al. | 206/387 |
| 3,746,180 | 7/1973 | Spiroch et al. | 206/387 |
| 3,994,550 | 11/1976 | Ackeret | 206/387 |
| 4,285,554 | 8/1981 | Bell et al. | 224/312 |
| 4,285,557 | 8/1981 | Paladino et al. | 206/387 |

Primary Examiner—William T. Dixson, Jr.
Attorney, Agent, or Firm—Kenyon & Kenyon

[57] ABSTRACT

A tape cassette holder for use with automobile and home tape systems includes a base and a plurality of partitioning members dimensioned to define channels therebetween which slideably engage the surface trapezoidal enlargements of a tape cassette inserted into the channel, in a manner which allows the cassette to move lengthwise but effectively prevents movement laterally or in a direction normal to the base. In the preferred embodiment, the tape cassette holder has backstopping means and resilient locking means for restraining lengthwise movement as well, whereby the cassette is held firmly in place regardless of the orientation of the holder, the cassettes being removable by application of sufficient force to overcome the resilient locking means.

3 Claims, 5 Drawing Figures

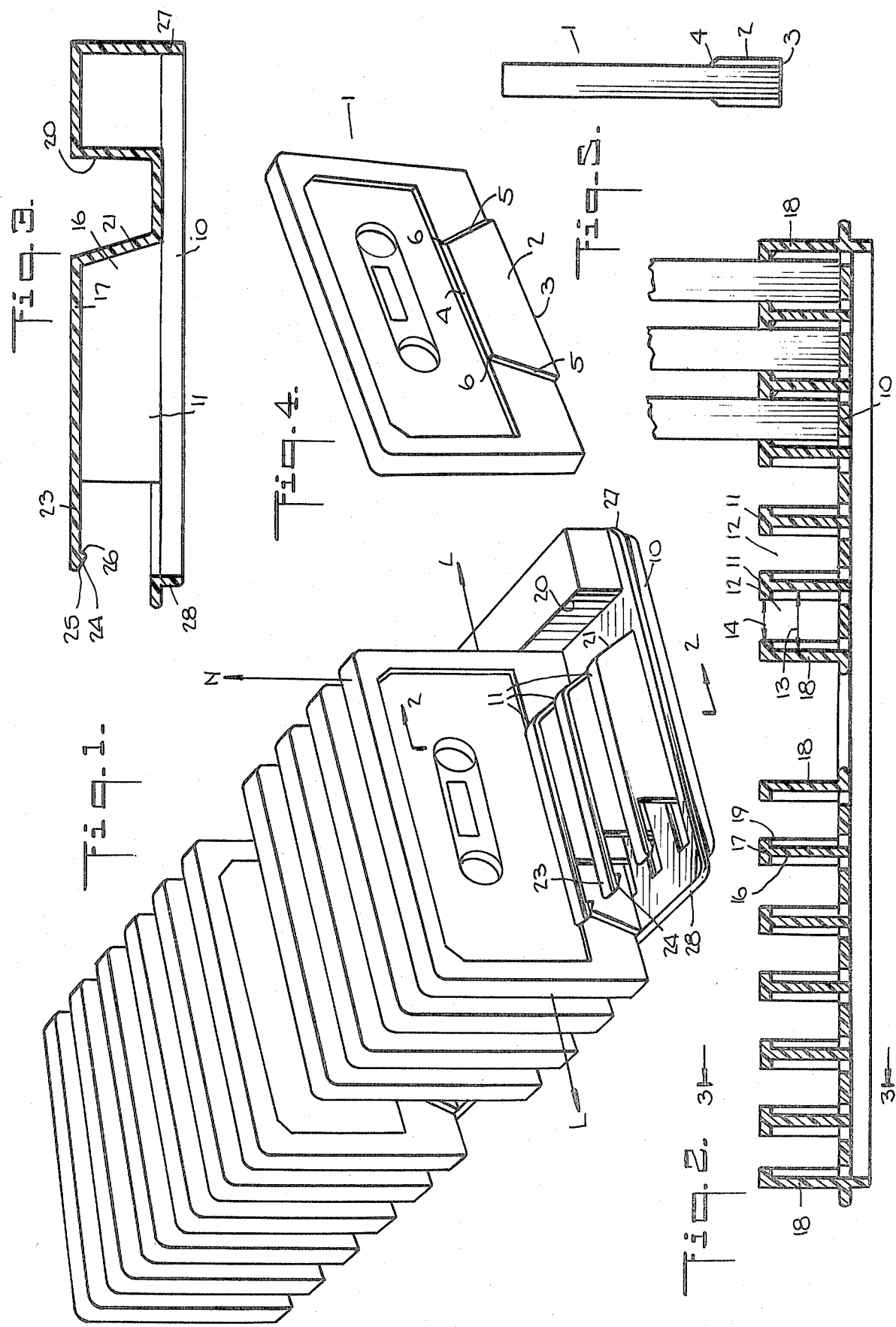

TAPE CASSETTE HOLDER

This invention relates generally to storage devices for tape cassettes and other closed-loop tape storage devices of the type having a raised enlargement along the surfaces thereof, particularly tape cassettes of the standarized size and configuration presently in widespread use with various types of audio equipment including stereo playing and recording and dictaphone equipment.

More particularly, the invention relates to tape cassette holders suitable for conveniently storing tape cassettes in an automobile for use with an automobile tape system or at home on shelves or in cabinets for use with home tape players or recorders.

It is known to store tape cassettes in devices of various box-like configurations having ribs or dividing walls between which the cassettes can be stored (see e.g., U.S. Pat. Nos. 3,603,478 and 3,677,396), but such devices are typically inconvenient, bulky and cumbersome, and of only limited suitability for use with automobile tape systems or for storage in tight quarters on shelves or in cabinets.

Tape cassette holders which engage the standardized trapezoidal enlargement on the surfaces of a tape cassette are also known (e.g., U.S. Pat. No. 3,610,424), but such devices do not have a plurality of channels dimensioned to slideably engage the trapezoidal enlargement in one direction while restraining motion in all other directions. Rather, they have a single open channel for receiving the trapezoidal enlargement and rely on a wedging action to hold the cassette in place.

It is also known to retain tape cassettes in place in cassette holders with locking means which engage the cassette (e.g., U.S. Pat. Nos. 3,561,004, 3,627,113 and 3,677,396), but such means have typically been separate arms designed to engage the guide ears or tape hubs of a cassette or the like, thus reducing the simplicity and durability of the device.

It is a principle object of the present invention to provide a tape cassette holder suitable for use in automobile or home.

It is a further object of the present invention to provide a tape cassette holder which permits a driver to remove a tape cassette easily with one hand in order to change tapes in an automobile stereo system while driving.

It is a further object of the present invention to provide a tape cassette holder which is capable of holding tape cassettes firmly in place while an automobile is in motion.

It is a further object of the present invention to provide a tape cassette holder which is small and light-weight so that it can be easily removed from an automobile and conveniently carried in one hand thereby avoiding the problem of theft when an automobile is parked.

It is a further object of the present invention to provide a tape cassette holder which is simple, durable and inexpensive to manufacture.

Still a further object of the present invention is to provide a tape cassette holder which allows the tape cassette labels to be observed at a glance, obviating the need for additional labeling on the holder.

These and other objectives of the present invention will become apparent to those skilled in the art from the description and claims which follow.

It has been found that these and other objects and advantages may be obtained from a tape cassette holder having a base and a plurality of substantially parallel partitioning members projecting from the base, between which the cassettes are inserted. The partitioning members define channels dimensioned to slideably engage in the lengthwise direction only the trapezoidal enlargements of a tape cassette. Specifically, the channels have a width at the base which corresponds to the thickness of a tape cassette at the trapezoidal enlargements. At a distance approximating the height of the trapezoidal enlargements, the channels narrow to a width corresponding to the thickness of the remainder of the cassette. The channel thus slideably engages the cassette's trapezoidal enlargements to permit lengthwise movement of the cassette while preventing movement normally or laterally with respect to the base.

In the preferred embodiment of the invention the lengthwise travel of a cassette into a channel is limited by backstopping means such as a rear wall or projection along one edge of the base.

Also, in the preferred embodiment, the cassette is restrained from sliding out of the holder by resilient locking means, such as resilient fingers with snap-locking projections which engage one corner of the trapezoidal enlargements when the cassette is fully inserted into the channel with the other end abutting the backstopping means. Since the resilient locking means holds the cassette in place regardless of the orientation of the holder, it is possible to mount the tape cassette holder through holes provided in its base either horizontally or vertically without affecting its utility. Additionally, the partitioning members need only extend a small distance beyond the top of a cassette's trapezoidal enlargements to hold the cassette securely within the device, thereby presenting no impediment to viewing the descriptive labels which may be found on the sides of a cassette.

The tape cassette holder of the present invention is suited to manufacture by the inexpensive and convenient method of integral molding and may thus be provided to the public at reasonable cost.

The foregoing objects, features and advantages of the invention will become more apparent from the following detailed description, in which:

FIG. 1 is a perspective view showing a tape cassette holder embodying the invention, with fully inserted tape cassettes;

FIG. 2 is a sectional view along lines 2—2 in FIG. 1;

FIG. 3 is a sectional view along lines 3—3 in FIG. 2;

FIG. 4 is a perspective view of a tape cassette; and

FIG. 5 is an end view of a tape cassette.

Tape cassette holders of the present invention are particularly suited for tape cassettes of the type shown generally at 1 in FIGS. 4 and 5, having a well known standardized size and configuration and widely used in home and automobile tape systems and office dictating equipment. Such cassettes have a pair of trapezoidally shaped surface enlargements 2, opposite each other at the bottom of the cassette. Each trapezoidal enlargement has a lower edge 3 coextensive with the bottom longitudinal edge of the cassette, a parallel upper edge 4, and opposed end edges 5, forming corners 6 of slightly less than 90 degrees where they meet the upper edge 4. Such cassettes are of course, thicker in the region between the trapezoidal enlargements 2 than in the region above the upper edge of the trapezoidal enlargements.

Referring to FIG. 1, the present invention provides a tape cassette holder having a base 10 and a plurality of substantially parallel partitioning members 11 projecting from the base. The partitioning members 11 are dimensioned to define channels 12 between them which slideably engage the trapezoidal enlargements of the tape cassettes. To this end, each channel has a relatively wider portion 13, corresponding in width to the thickness of the cassette in the region of the trapezoidal enlargements, and a relatively narrower portion 14 corresponding in width to the thickness of the remainder of the cassette. The relatively wider portion 13 extends from the base a distance approximately equal to the height of the trapezoidal enlargement 2. It will be appreciated that each of the foregoing dimensions of the channel 12, described for convenience as corresponding to a dimension of the cassette, must in fact be slightly greater than the corresponding dimensions of the cassette to allow free and easy sliding engagement and to allow for variations in dimensions of cassettes within the limits for manufacturing tolerance. The extent to which the dimensions of the channel exceed the corresponding dimensions of the cassette is not critical, provided they effectively prevent lateral movement of the cassette, but the relatively narrower portion of the channel 14 must be narrower than the cassette in the region of the trapezoidal enlargements so that the cassette is prevented from substantial movement in the direction normal to the base. As a result of the foregoing dimensions of the channel 12, a tape cassette inserted between the partitioning members 11, i.e. as shown in FIG. 1, is effectively limited to movement in the lengthwise direction (shown by the arrow L) and prevented from substantial movement in the lateral direction or in the direction normal to the base (shown by the arrow N).

The relatively wider and narrower portions of the channels, 13 and 14 respectively, are provided by the design of the partitioning members 11. Each partitioning member has a main portion 16, extending from the base a distance approximately equal to the height of the trapezoidal enlargement, which cooperates with the corresponding portion on the next partitioning member to define the relatively wider portion 13 of the channel 12, and a restraining edge 17 which cooperates with the corresponding restraining edge of the next partitioning member to define the relatively narrower portion 14 of the channel 12. Preferably, each partitioning member, except the end partitioning members (and/or partitioning members either side of a central gap for convenient carrying) 18, lies between channels and defines one side of the channel on each side of it, as shown in FIGS. 1-2. In this embodiment, the restraining edge 17 of the partitioning member can be a relatively thicker portion of the partitioning member which extends further into the channel on each side of the partitioning member, so as to slideably engage on its undersides 19 the upper edge 4 of the trapezoidal enlargement on a cassette inserted into the channel on each side of the partitioning member. By this arrangement, when multiple cassettes are stored in the device, each cassette serves to lend support to the partitioning members 11, thereby strengthening the holders grip on adjacent inserted cassettes.

The main portion of the partitioning member 16 can be a solid wall, a wall with openings, or support members of any suitable configuration, it being appreciated that the configuration is not important, as long as it is sufficient to maintain the restraining edge 17 in fixed spaced relationship to the base 10, and so long as it does not interfere with the sliding engagement of the cassettes. Preferably, the partitioning members 11 are contoured to correspond to the shape of the cassette's trapezoidal enlargements and do not extend the full width of the base, thereby saving material and making the cassette holder better suited to manufacture by a unitary molding operation.

In the preferred embodiment of the invention, backstopping means, such as a backstopping wall 20 shown in FIG. 1 are provided along one edge of the base 10 to stop the lengthwise travel of a cassette when it has been fully inserted in the holder. Alternatively, the backstopping means can be provided by having the restraining edge 17 contoured, as shown at 21 in FIGS. 1 and 3, to engage the leading end edge of the trapezoidal enlargement when the cassette is fully inserted into the channel, thus rendering backstopping wall 20 unnecessary. In the preferred embodiment of the invention, however, backstopping means comprises both the contoured restraining edge 21 and backstopping wall 20, since the backstopping wall 20 also serves to add structural strength and rigidity to the base 10. In the alternative, where no backstopping means is provided integral with the holder, the holder should be mounted against an external wall, floor or shelf along the edge of the base, so that the external wall, floor or shelf can serve as the backstopping means to stop the cassette when fully inserted.

In the preferred embodiment of the invention, the partitioning members 11 are also provided with resilient locking means to prevent fully inserted cassettes from sliding back out without application of a force sufficient to overcome such locking means. Preferably, such means comprise a resilient finger like member 23 projecting from each partitioning member 11 with a snap-locking projection 24 on the end thereof, positioned to engage the corner 6 of the trapezoidal enlargement, as shown in FIG. 1. As shown in FIG. 3, the snap-locking projection 24 is beveled at 25 to cause the resilient finger like member 23 to deflect over the upper edge 4 of the trapezoidal enlargement when a cassette is inserted into the holder. The surface 26 is preferably substantially parallel to the end edge 5 of the trapezoidal enlargement and snaps over the corner 6 as soon as the cassette is fully inserted, i.e., as soon as it abuts against the backstopping means. When sufficient force is supplied, the angle of the surface 26 causes the snap-locking projection 24 to deflect over the upper edge 4 of the trapezoidal enlargement so that the cassette can be removed.

The resilient locking means is relatively more important to the operation of the invention where the base is mounted horizontally, and is, of course, essential if the base is mounted in a position where the rear edge 27 is elevated above the front edge 28. In applications where the base 10 is mounted vertically with the rear edge 27 on the floor or shelf, the resilient locking means is relatively less important, though still preferable for holding the cassettes firmly in place and for convenience in carrying the holder loaded with cassettes when removed from its mounting.

In the preferred embodiment of the invention, the height of the partitioning members 11 is kept as low as possible, so that the labels on the cassettes remain exposed as shown in FIG. 1. Preferably, the partitioning members 11 extend just high enough for the restraining edges 17 to fit over the upper edges 4 of the trapezoidal enlargements.

The tape cassette holder provided by the present invention is particularly suited for mounting underneath the dashboard or on a floor console of an automobile for use with an automobile tape system, although it is also useful in the home or office, or anywhere else where convenient storage of cassettes is desired.

The design is readily adaptable to injection molding techniques, which permits the holder to be inexpensively manufactured in one lightweight and durable piece. The light weight is important for a driver who prefers to remove the holder to prevent theft when parking his automobile. To this end, it is also possible to provide mounting means (not shown), such as tongue in groove or snap-in projections, on the underside of the base which cooperate with a more permanently mounted frame (not shown) so that the cassette holder can be readily and conveniently removed.

It is also possible to provide mounting means comprising a series of cloverleaf-shaped apertures in the base, each aperture having a relatively larger central portion which is dimensioned to fit over the heads of screws or studs permanently fixed to the dashboard or other surface where the cassette holder is normally mounted, and a plurality of relatively narrower leaf portions dimensioned to fit snugly around the stems of such screws or studs, such that the holder can be readily mounted by passing it over the screws or studs when aligned with the central portion of the cloverleaf apertures and then snapping it snugly in place by a lateral movement in the direction of any of the leaf portions of the cloverleaf apertures.

What is claimed is:

1. A tape cassette holder comprising a base; a plurality of substantially parallel partitioning members projecting from the base, said partitioning members defining therebetween a plurality of channels dimensioned to slideably engage in the lengthwise direction only the trapezoidal enlargements of a tape cassette and being adapted and positioned on said base so that each channel shares at least one partitioning member with an adjacent channel; a backstopping means for limiting the path of travel of the tape cassette in the channels defined by said partitioning members and a resilient locking means on at least one of the partitioning members defining each channel, said resilient locking means being adapted to engage the top edge of the trapezoidal enlargement of a tape cassette and to resiliently deflect in an upward direction from said top edge as a tape cassette is inserted into the channel and to resiliently return to a position of overlapping engagement with the corner of the top edge of said trapezoidal enlargement when the tape cassette is fully inserted.

2. A tape cassette holder according to claim 1 wherein the partitioning members are dimensioned to afford an unrestricted view of the tape cassette labels.

3. A tape cassette holder according to claim 1 further including mounting means for removeably mounting the tape cassette holder.

* * * * *